United States Patent [19]

Haitani

[11] Patent Number: 4,797,757
[45] Date of Patent: Jan. 10, 1989

[54] SERVO HEAD POSITIONER WITH PULSE ADJUSTING CIRCUITRY

[75] Inventor: Munehisa Haitani, Furukawa, Japan

[73] Assignee: Alps Electric Co., Ltd., Japan

[21] Appl. No.: 899,812

[22] Filed: Aug. 25, 1986

[30] Foreign Application Priority Data

Aug. 23, 1985 [JP] Japan .............................. 60-128571[U]

[51] Int. Cl.$^4$ ............................................. G11B 5/596
[52] U.S. Cl. ............................... 360/77.08; 360/78.14
[58] Field of Search ....................... 360/70, 77, 78, 69;
324/120; 340/347 AD; 307/528, 269, 510, 527,
234; 328/129.1, 134, 140, 108; 331/14; 364/556;
377/20

[56] References Cited

U.S. PATENT DOCUMENTS

| | | | |
|---|---|---|---|
| 3,201,781 | 8/1965 | Holland | 324/120 UX |
| 3,868,677 | 2/1975 | Kidd | 340/347 AD |
| 4,297,734 | 10/1981 | Laishley et al. | 360/77 |
| 4,414,586 | 11/1983 | Hirota et al. | 360/70 |
| 4,462,053 | 7/1984 | Lum et al. | 360/78 |
| 4,516,162 | 5/1985 | West | 360/77 |
| 4,530,019 | 7/1985 | Penniman | 360/77 |
| 4,542,428 | 9/1985 | Yanagi | 360/77 |
| 4,586,094 | 4/1986 | Chambors et al. | 360/77 |

OTHER PUBLICATIONS

Otto R. Buhler, Electronic Design, vol. 25, No. 1, Jan. 4, 1977, pp. 104–106.
Electronics Engineer's Reference Book, Fifth edition, 1983, edited by F. F. Mazda, pp. 47/14–16; TK 7825 E14, 1983.

Primary Examiner—Alan Faber
Assistant Examiner—David L. Robertson
Attorney, Agent, or Firm—Guy W. Shoup; Paul J. Winters

[57] ABSTRACT

A servo control apparatus which performs accurate servo control has a voltage controlled oscillator which provides a signal which has an oscillation frequency based on the servo information stored on the disk, a reversible counter which counts the output signal of the voltage controlled oscillator for addition or substraction, and a stepping motor which is driven by the counted output of such reversible counter for positioning a head relative to a disk. A "window" for setting the signal supply period for the reversible counter is generated in sychronization with the servo data.

3 Claims, 5 Drawing Sheets

SERVO HEAD POSITIONER WITH PULSE ADJUSTING CIRCUITRY

BACKGROUND OF THE INVENTION

1. Field of the Invention

The present invention relates to a servo control apparatus and particularly to a servo control apparatus which realizes accurate positioning with a positioner within a servo drive system.

2. Description of the Prior Art

As an applied version of such servo control apparatus, an apparatus which positions a head which magnetically records information to the recording surface of a magnetic disk and reproduces such information is already known.

For example, the U.S. Pat. No. 4,488,187 entitled "Servo Control Apparatus" is a typical example. In this patent, however, as a positioning means, a first pulse group and a second pulse group are generated as first servo data and second servo data, and the respective pulse groups are counted and stored individually. Accordingly, this example has a problem that the means for obtaining servo control data is complicated, the apparatus structure becomes large in size and more costly.

To eliminate the above-mentioned problem, the applicant of the present invention previously filed on Aug. 10, 1985, the patent application entitled "Servo Control Apparatus". In the latter application, a voltage controlled oscillator and a reversible counter are used to count the relative displacement of the head, and the count is converted by a digital converter to obtain the servo data for head position control.

This method, however, has the disadvantage that since it is difficult to determine the count start time of a reversible counter and thereby the situation of inaccurate counting of servo data pulses may occur.

SUMMARY OF THE INVENTION

It is an object of the present invention to provide an economical servo control apparatus having a simplified structure which realizes accurate servo control.

The present invention is characterized in that a "window" which causes a reversible counter to execute counting is generated in synchronization with the servo data.

The novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be understood, however, that the drawings are for the purpose of illustration and description only and are not intended as a definition of limits of the invention.

BRIEF DESCRIPTION OF THE DRAWINGS

FIG. 2(a)–(i) are timing waveforms indicating respective signals in the embodiment of the present invention.

FIG. 4(A)–(B) shows the relation between a data track of a disk and the embedded servo information.

FIG. 6 (a)–(g) are signal timings for explaining the operation of the circuit of FIG. 5.

DESCRIPTION OF THE PREFERRED EMBODIMENTS

A preferred embodiment of the present invention is explained in detail by referring to the accompanying drawings.

Figure 1:
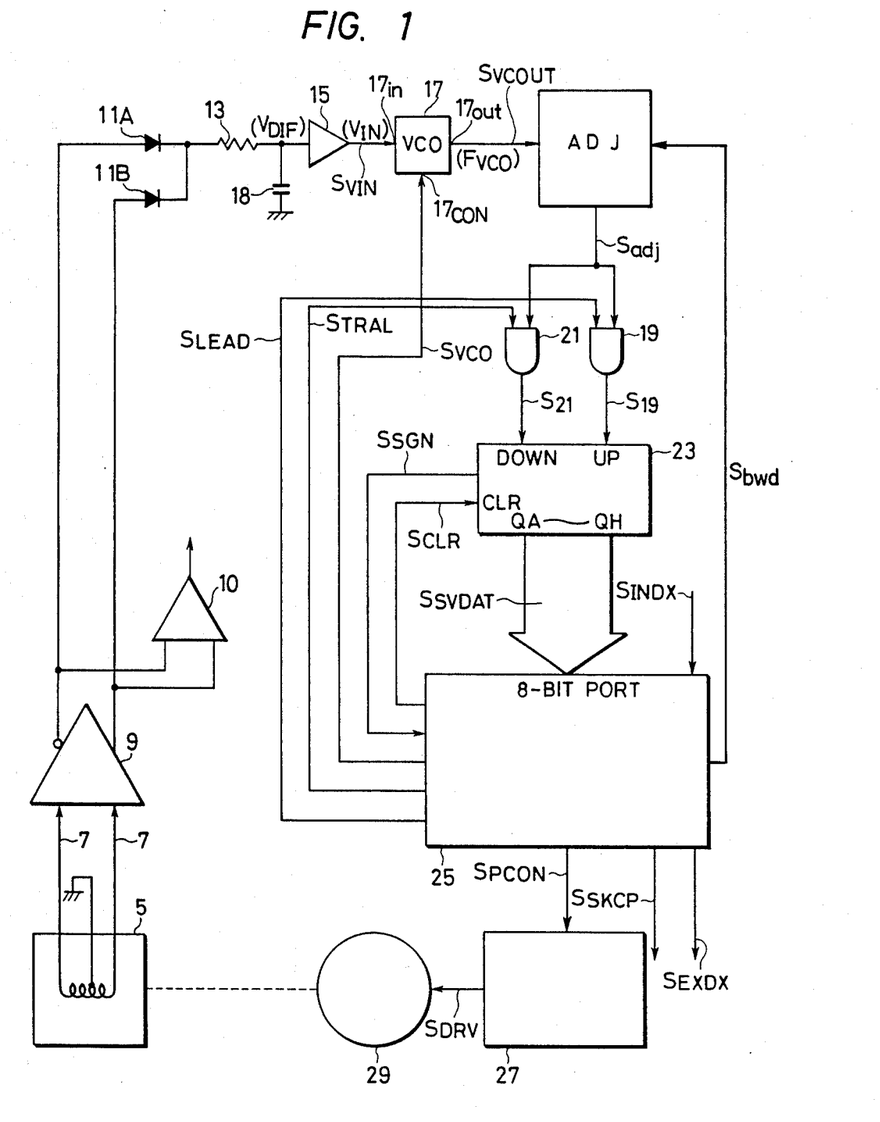
FIG. 1 is a block diagram illustrating a structure of a servo control apparatus of an embodiment of the present invention.

FIG. 1 is an embodiment of the present invention. In this figure, a position detection signal 7 sent from a magnetic head 5 is amplified by an amplifier 9 and is then supplied to the anode side of diodes 11A and 11B. The cathode sides of both diodes 11A, 11B are connected in common and are connected to a voltage control input terminal $17_{in}$ of a voltage controlled oscillator (hereinafter, referred to as VCO) through a resistor 13 and an amplifier 15. The input terminal of this amplifier 15 is grounded through a capacitor 18. An output terminal $17_{out}$ of VCO 17 is connected to the input terminal of count pulse adjusting circuit ADJ and the output terminal thereof is connected respectively to the ends of AND gates 19 and 21. The output terminal of the one AND gate 19 and the output terminal of the other AND gate 21 are respectively connected to the addition input terminal UP and the subtraction input terminal DOWN of reversible counter 23. The output signals QA–QH which indicate the counting condition of this reversible counter 23 are supplied to the 8 bits input port of a microcomputer as the servo data signal S SVDAT.

The addition/subtraction code signal S SGN sent from the reversible counter 23 is supplied to the other input port of the microcomputer 25. An internal index signal S INDX is generated upon detection of a mechanical index position 313 on the disk (See FIG. 3) once each revolution. Upon receipt of the S INDX signal, the position control signal S PCON, external index S EXDX, seek complete signal S SKCP, clear signal S CLR, oscillation control signal S VCO, leading edge control signal S LEAD, training edge control signal S TRAL are generated with the execution of a position control program from the output port of the microcomputer 25. The position control signal S PCON is supplied to a stepping motor drive control circuit 27, while the clear signal S CLR to a clear input terminal CLR of the reversible counter 23, the oscillation control signal S VCO to an output terminal $17_{CON}$ for controlling oscillation start and stop of VCO 17, the leading edge control signal S LEAD to the other end of the one AND gate 19 and the trailing edge control signal S TRAL to the other end of the other AND gate 21, respectively.

The motor drive control signal S DRV generated from the stepping motor drive control circuit 27 is supplied to the stepping motor 29. This stepping motor 29 moves a head 5 through a mechanical coupling means.

In the structure described above, VCO 17 oscillates with a frequency F VCO which is proportional to a voltage $V_{in}$ of signal $S_{vin}$ supplied from the amplifier 15 to the voltage control input terminal $17_{in}$ and it is used as a voltage-frequency converter. However, this oscillating operating is started and stopped by the oscillation control signal S VCO supplied to the control input terminal $17_{CON}$ and the oscillation output signal S VCOUT in variable frequency F VCO is generated from the output terminal $17_{out}$ during the period from start to stop of oscillation. Here, the oscillation output signal S VCOUT is a pulse output signal which has the duty cycle of 50% and has a repetition frequency F VCO which changes proportional to the voltage $V_{in}$.

The one AND gate 19 allows an output signal $S_{adj}$ of the count pulse adjusting circuit ADJ to pass only when the leading edge control signal S LEAD is in the "HIGH" level and supplies an addition input signal S19 generated from the output terminal to the addition input terminal UP of the counter 23. In the same way, the other AND gate 21 supplies the subtraction input signal S21 to the subtraction input terminal DOWN of the reversible counter 23 only when the trailing edge control signal S TRAL is in the "HIGH" level. The reversible counter 23 executes counting for addition for each input of pulse of the addition input signal S19. After the countings for addition and subtraction described above, the addition/subtraction code signal S SGN" which indicates "positive" code when the final counting value is "0" (initial value) or larger or "negative" code when it is smaller than "0" is generated.

A head output signal is obtained by amplifying an output of the amplifier 9 with another amplifier 10.

Figure 3:
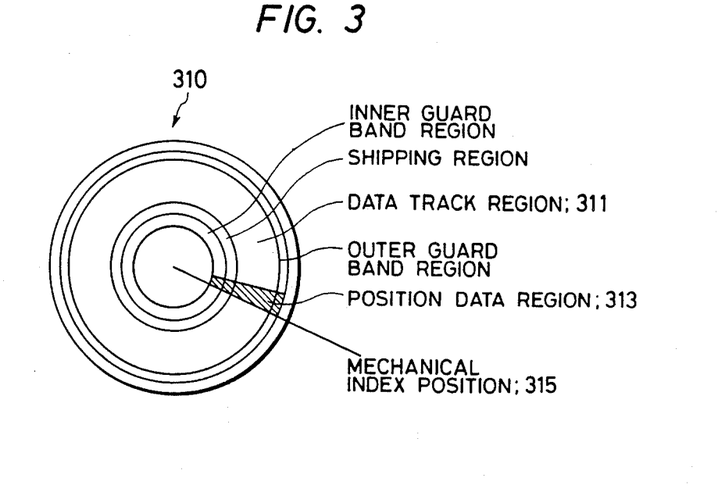
FIG. 3 is a structural diagram of the data surface of a disk to which a magnetic head is positioned for the position control according to the embodiment of the present invention.

FIG. 3 shows a structure of data surface of a magnetic disk for explaining the positioning operation of an apparatus of the embodiment of the present invention.

The servo data for the positioning operation is obtained by detecting displacement of magnetic head 5 on the basis of the embedded servo information written on a part of position information region 313 of data track 311 of magnetic disk 310. By employing a micro step drive system where an amount of compensation for compensating displacement is given as an unbalance current to a couple of excitation phases of the stepping motor 29, positioning is carried out to move the magnetic head 5 to the target track.

Figure 4:
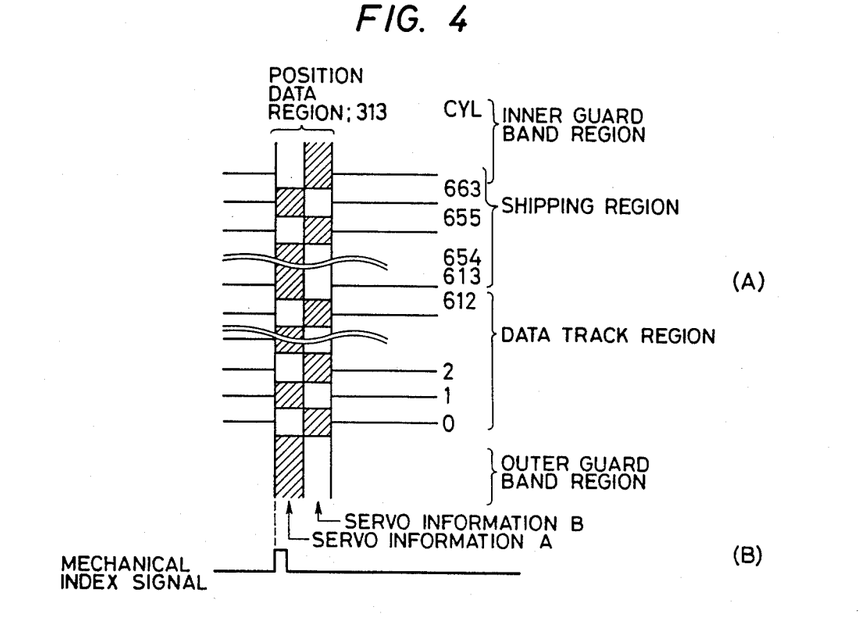

FIG. 4 (A)–(B) show a relation for obtaining servo data for magnetic disk 310 which forms the data surface as shown in FIG. 3 in the embodiment of the present invention.

FIG. 4(A) shows relation between data track region 311 and the position information region 313 in which the embedded servo information is written. Here, the start of the position information region 313 is marked by detection of the mechanical index position 315 with an index sensor (not illustrated) and the servo information is written before delivery at the factory with reference to the mechanical index signal which is an ouput of the index sensor.

The position information region 313 has two patterns in which a magnetization inversion section and non-magnetization inversion section (erasing section) are disposed alternately, as the servo information shown in FIG. 4(A). The servo information is arranged in two lines in the radial direction so that the interface between the magnetization inversion section and non-magnetization inversion section in the circumferential direction is located at the center of data track. Two lines of servo information in the radial direction where two patterns are alternately arranged are detected as servo information A which is nearer to the mechanical index position 315 in the position information region 313 and the servo information B which is farther from said mechanical index position 315.

In the positional relation of the two servo patterns, when said magnetic head 5 is located at the center of data track, the amplitude values of the servo information A and B are equal to each other. If the magnetic head 5 is displaced from the center of track, a difference is generated in the signal amplitude values of servo information A and B read out in proportion to such displacement. The final amount of compensation is obtained on the basis of such difference of signal amplitude values of both servo information A and B, and an unbalance current corresponding to such amount of compensation is supplied to the stepping motor 29. In this case, the stepping motor 29 is driven with micro steps so that the difference of signal amplitude values of both servo information A and B can be eliminated.

As described previously, a detection signal 7 is generated from the magnetic head 5, based on the servo information A and B and a DC voltage V DIF which is proportional to the signal amplitude value in accordance with displacement is generated at the input side of the amplifier 15. This voltage V DIF is amplified by the amplifier 15 and is then supplied to VCO 17 as the signal S VIN of voltage $V_{in}$.

Next, the operations as a whole of an embodiment of the present invention are explained. In the following description, "leading edge zone", "trailing edge zone" correspond to "servo information A" and "servo information B" described above, respectively.

For simplification of description, an oscillation output S VCOUT of VCO 17 is not adjusted by the count pulse adjusting circuit ADJ and it is used as an output signal $S_{adj}$ in the adjusted condition.

Here, the internal seek complete signal S INSKCP shown in FIG. 2(a) is set to the "LOW" level at the timing T1 (TRUE" condition indicating that a seek operation is not in effect). The S INSKCP signal is an internal status signal of the microcomputer 25 which is set upon completion of a track seek operation.

Thereafter, as shown in FIG. 2(b), the internal index signal S INDX is set to the "LOW" level at the timing T21 by detection of the mechanical index position 315 to indicate the start of the position information region 313. The signal at this timing T21 becomes the first index. When the internal index signal S INDX is set to the "LOW" level, the microcomputer 25 opens the "WINDOW" which is a prescribed time period during which the position information region 313 is read and a track centerline adjustment is made before the start of the data track region 311. The microcomputer 25 supplies the clear signal S CLR of negative pulse t the reversible counter 23 as shown in FIG. 2(a) and thereby clears the counting condition of said reversible counter 23 (initialize to the value "0" ). Thereby, all output signals QA–QH become zero. Simultaneously, the oscillation control signal S VCO is set to the "LOW" level as shown in FIG. 2(d). As a result, VCO 17 is controlled to oscillate at the repetition frequency F VCO which is proportional to the input voltage $V_{in}$ at that time. Namely, the signal amplitude value corresponding to both servo information A and B detected by the magnetic head 5 is converted to a frequency.

As described above, VCO 17 generates an oscillation signal S VCOUT of the frequency F VCO, but since the leading edge control signal S LEAD and the trailing edge control signal S TRAL being output from the microcomputer 25 are set at first in the "LOW" level ("FALSE" condition), both AND gates 19 and 21 do not generate an output pulse.

In sequence, the leading edge control signal S LEAD is set to the "HIGH" level ("TRUE" condition) as shown in FIG. 2(f) (at the timing T3), in accordance with the servo data of the leading edge zone read by the magnetic head 5. Thereby, the one AND gate 19 outputs an addition input signal S19 and the reversible counter 23 counts for addition for each pulse sent from said AND gate. This counting operation for addition is continued until the timing T4 during the perior T LEAD of the leading edge window.

Moreover, when the magnetic head 5 reads the servo data of trailing edge zone, the microcomputer 25 sets the training edge control signal S TRAL to the "HIGH" level ("TRUE" condition) as shown in FIG. 2(g) (at the timing T5), and then sets to the "LOW" level at the timing T6 after the trailing edge window period T TRAL. During such trailing edge window period T TRAL, the pulse of oscillation output signal S VCOUT($S_{adj}$) passes through the other AND gate 21 and thereby a subtraction input signal S21 is generated. Therefore, the reversible counter 23 executes counting for subtraction for each input of pulse of the subtraction input signal S21.

Since the repetition frequency F VCO of the pulse counted for addition and subtraction during the leading edge window period T LEAD and trailing edge window period T TRAL is proportional to a voltage ($V_{in}$) read by the magnetic head 5, the counted value of the reversible counter 23 corresponds to the displacement of the head.

In the succeeding trailing edge window period T TRAL, counting for subtraction is carried out by counting down from the counted value CNTL previously obtained at the time of completing the counting for addition in the preceding leading edge window period T LEAD. Therefore, a counted value CNTT at the time of completing the counting T6 is converted to a digital amount corresponding to the difference of displacement between the leading edge zone and trailing edge zone. Namely, displacement on the track is converted to very highly accurate digital information.

After the timing T6, the servo data signal S SVDAT which indicates the absolute value of counted value CNTT with 8 bits and the addition/subtraction sign signal S SGN which indicates the sign (plus or minus) of the counted value CNTT are supplied to the microcomputer 25 from the reversible counter 23. Here, the fact that the data indicated by the addition/subtraction sign signal S SGN is positive or negative means that displacement at the leading edge zone is relatively larger or smaller than that at the trailing edge zone.

The microcomputer 25 controls the stepping motor 29 so that such displacement becomes equal, based on both signals S SVDAT or S SGN. Namely, the microcomputer 25 supplies a direction signal which causes forward or backward rotation in accordance with a positive or negative addition/subtraction sign signal and a position control signal S PCOM which indicates the absolute rotation amount indicated by the servo data signal S SVDAT to the stepping motor motor drive control circuit 27. Corresponding to this position control signal S PCON, the motor drive signal S DRV is generated, thereby the stepping motor 29 is rotated for position control of magnetic head 5. Therefore, the position adjustment of the magnetic head 5 is carried out for each single turn of disk 310.

After the timing T8, VCO 17 is not required to oscillate. Therefore, the microcomputer 25 resets the oscillation control signal S VCO to the "HIGH" level (at the timing T7). In this timing, oscillation of VCO 17 is stopped, and the external index signal S EXDX is generated as shown in FIG. 2(c).

Upon completion of such operations, the servo operation of the first single rotation also completes. Thereafter, the servo operation of the second single turn after the timing T22 is started.

However, when the oscillation output signal S VCOUT of VCO 17 is supplied without adjustment to both AND gates 19 and 21, accurate counting of zero data pulse as described heretofore is sometimes not carried out. Therefore, in the present invention, a count pulse adjusting circuit ADJ is inserted to realize accurate counting.

Figure 5:
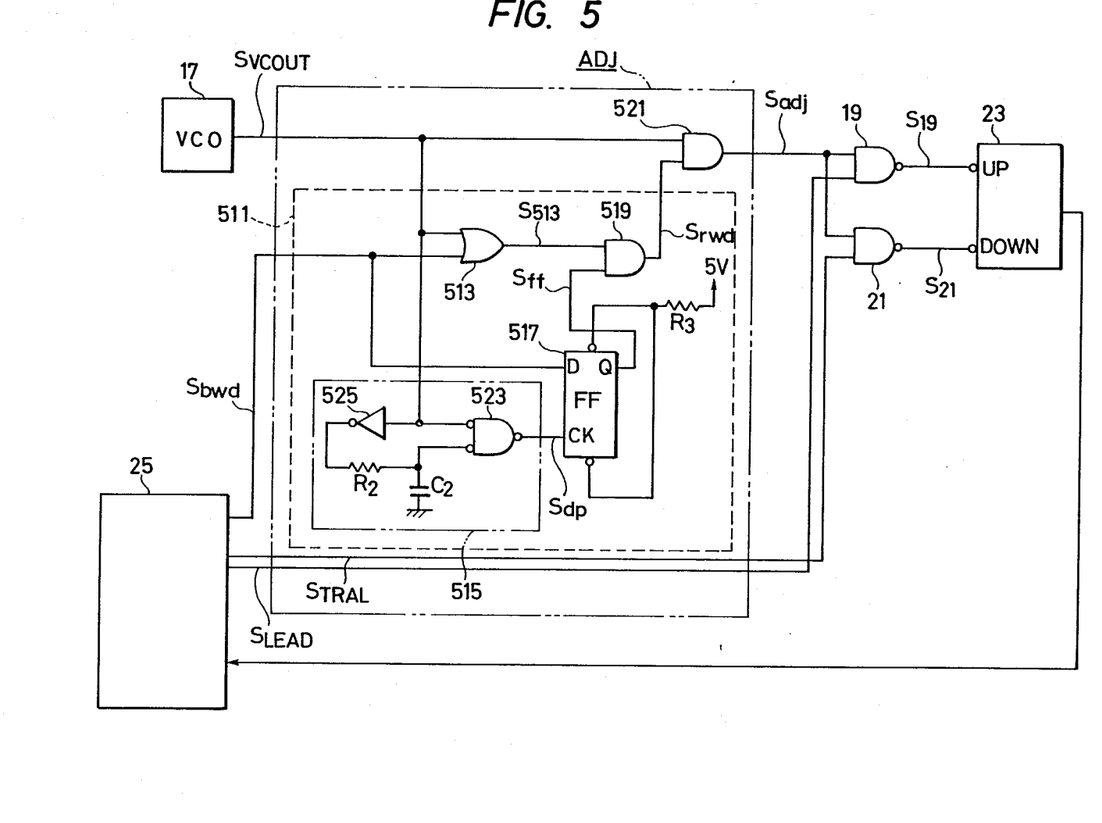
FIG. 5 is a practical diagram of the count pulse adjusting circuit shown in FIG. 1.

FIG. 5 is a practical structure of the count pulse adjusting circuit ADJ shown in FIG. 1.

In FIG. 5, the oscillation signal S VCOUT of VCO 17 is supplied to the OR gate 513 in the window generation circuit 511 and is delayed for the predetermined time by a delay circuit 515 and is then applied, as the delayed pulse signal $S_{dp}$, to the clock input terminal CK of the D-flipflop (FF) 517.

The basic window signal $S_{bwd}$ output from the microcomputer 25 is respectively input in common to the OR gate 513 and the D input terminal of FF 517.

The AND gate 519 executes the AND operation for the OR output signal S513 of the OR gate 513 and Q output signal $S_{ff}$ of FF 517 and an output thereof is generated as the real window signal $S_{rwd}$ from the window generation circuit S11. This real window signal $S_{rwd}$ and output signal S VCOUT of VCO 17 are ANDed by the AND gate 521 and its output is generated as the output signal $S_{adj}$ of count pulse adjusting circuit ADJ.

R3 is a pull-up resistance of FF 517. In the delay circuit 515, the oscillation output signal S VCOUT is supplied in common to the one end of OR gate 523 and the inverter 525. An inversion output signal of this inverter 525 is supplied to an integral circuit formed by a resistor R2 and a capacitor C2 and it's integral signal is applied to the other end of OR gate 523.

FIG. 6(a)-(g) show the signal timings for the operations of the Circuit of FIG. 5.

Figure 2:
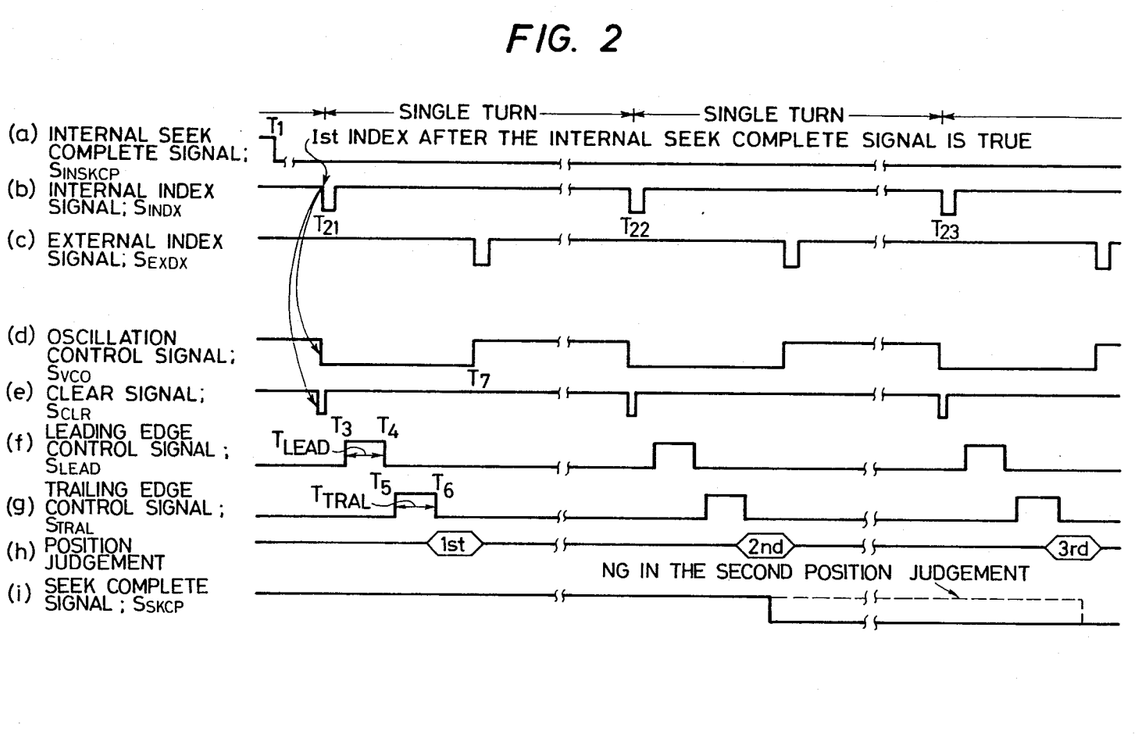
Figure 6:
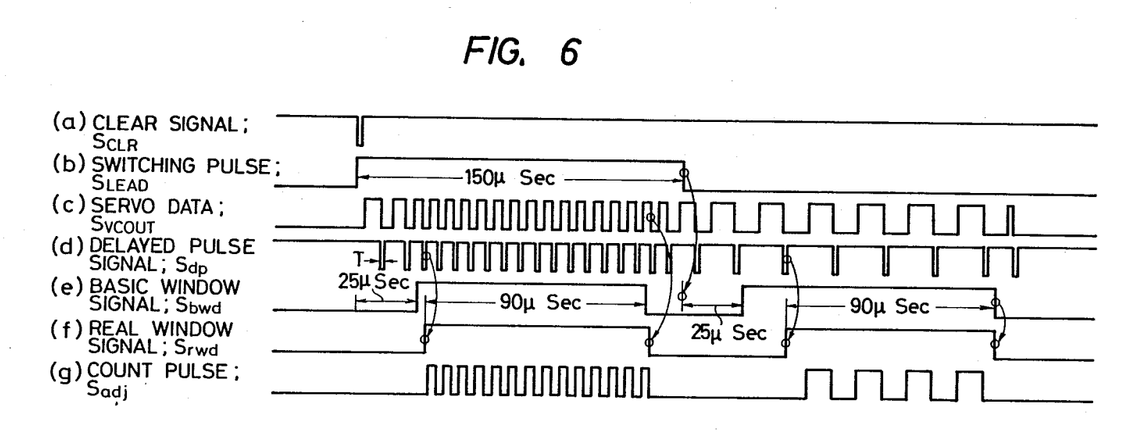

First, the clear signal S CLR (refer to FIG. 6(a)) is generated and the switching pulse shown as (b) (corresponding to the leading edge control signal S LEAD shown in FIG. 2) simultaneously rises. Under this condition, the oscillation output signal S VCOUT of VCO 17 (servo data of FIG. (c)) is input and the capacitor C2 in the delay circuit 515 performs charging or discharging in accordance with pertinent servo data level.

When the servo data is in the "HIGH" level, the delayed pulse signal $S_{dp}$ (refer to FIG. 6(D)) output from the delay circuit 515 is also set to the "HIGH" level. When the servo data falls to the "LOW" level from the "HIG" level for the period required for charging of capacitor C2. Therefore, the delayed pulse signal $S_{dp}$ changes to the "LOW" level.

Moreover, when the capacitor C2 is charged and the other input terminal of OR gate 523 becomes "HIGH" level, the output, delayed pulse signal $S_{dp}$ changes to the "HIGH" level. In this case, a time interval T is very short period, the servo data is always in the "LOW" level at the rising time of the delayed pulse signal $S_{dp}$.

FF517 outputs the level of basic window signal $S_{bwd}$ (refer to FIG. 6(e)) with the delayed pulse signal $S_{dp}$ used as the clock signal. Namely, FF517 outputs signal $S_{ff}$ of the "HIGH", "LOW" levels in accordance with the "HIGH" and "LOW" levels of basic window signal $S_{bwd}$ when the delayed pulse signal $S_{dp}$ rises.

The AND gate 519 outputs the real window signal $S_{rwd}$(refer to FIG. 6(f)) which becomes the "HIGH" level when any of the basic window signal $S_{bwd}$ or servo data (S VCOUT) is in the "HIGH" level, while the output signal $S_{ff}$ of FF 517 is in the "HIGH" level.

Only when the real window signal $S_{rwd}$ thus obtained is in the "HIGH" level, the servo data (S VCOUT) passes through the AND gate 521 and is generated as the output signal $S_{adj}$ of the count pulse adjusting circuit ADJ (refer to FIG. 6(g)). This output signal $S_{adj}$ is supplied to both gates 19 and 21 and is counted by the reversible counter 23.

The reversible counter 23 executes counting for addition when the switching pulse (S LEAD) is in the "HIGH" level and also counting for subtraction when it is in the "LOW" level. However, the signal S TRAL supplied to the AND gate 21 is the signal obtained through logical inversion of the switching pulse (S LEAD).

Based on the counting for addition or subtraction thus carried, the microcomputer 25 controls rotation of the stepping motor 29 and executes positional control of head 5.

In other words, since the real window signal Srwd rises when the delayed pulse signal $S_{dp}$ is triggered by the fall of servo data, the real window opens only when the servo data is in the "LOW" level. Moreover, the real window closes only when the basic window is closing and the servo data is in the "LOW" level. Therefore, since the real window does not open or close in the course of generating of servo data (in the "HIGH" level), an accurate pulse count can be counted as the signal $S_{adj}$. This is particularly effective when the amount of compensation (amount of displacement) is small (namely, the number of pulses of servo data is small).

In the above embodiment, VCO 17 is used as a proportional conversion of voltage and frequency but may also be used in reverse proportional relation. In this case, the absolute value of rotation indicated by the position control signal S PCON is set to change in reverse proportion to the servo data signal S SVDAT.

Moreover, an apparatus which converts the signal of VCO 17 in the form of other digital data, for example, amplitude of voltage into period or pulse width may be used. In this case, the reversible counter 23 is not used as the frequency counter but a counter for measuring time duration. Namely, the reversible counter 23 may be formed as the apparatus which measures other digital values.

It is not essential for the reversible counter 23 to first execute the counting for addition as the counting sequence and it may execute first the counting for subtraction. In short, it is essential to finally determine the amount of compensation of the head.

Moreover, the present invention is not limited to the positioning of a head for a magnetic disk and of course can be adapted to the positioning of a head for another type of information recording disk, for example, an optical-magnetic disk.

According to the present invention, a servo control apparatus is provided which has a simplified structure and is capable of realizing position control of the head to the disk with high accuracy, by setting constant the count start timing of the reversible counter.

Although particular embodiments of the present invention have been described and illustrated herein, it is recognized that modifications and equivalents may readily occur to those skilled in the art. Consequently, it is intended that the claims may be interpreted to cover such modifications and equivalents and that the invention be limited only thereby.

What is claimed is:

1. A servo control apparatus for positioning a head at a target track position on a disk, comprising:

a position data region extending radially of the disk having recorded therein servo information for indicating deviation of the head from any selected one of a plurality of track positions of the disk;

indexing means for providing an index signal marking said position data region on the disk;

reading means including the head for reading the servo information stored in the position data region for a target track on which the head is to be precisely positioned;

signal providing means for providing a pulse signal representing the servo information which is read by the head in the position data region of the disk;

control means responsive to said index signal from said indexing means for generating a basic window signal representing a predetermined pulse signal supply time period in which deviationindicating pulses occurring in said pulse signal are to be supplied as an output;

adjusting means receiving said pulse signal from said signal providing means and said basic window signal from said control means for providing an adjusted output signal of only the deviationindicating pulses of said pulse signal occurring within said predetermined time period;

counting means including a reversible counter for maintaining a pulse count based upon said adjusted output signal which is indicative of the deviation of the head from the target track position of the disk; and driving means for driving said head to the precise target track position in accordance with the counted output of said reversible counter.

2. A servo control apparatus according to claim 1, wherein said servo information of said position data region is comprised of two side-by-side patterns of data extending radially of the disk, wherein the data of the two patterns are disposed in paired fashion corresponding to each track position of the disk, said signal providing means being a voltage controlled oscillator which provides an oscillation signal having a frequency corresponding to the amplitude of a voltage signal corresponding to the data read by the head from said position data region, said reversible counter counting up based upon data read in one of said patterns and counting down based upon the paired data read in the other of said patterns for providing a count indicative of the amount of positional deviation of the head from a centerline position of a track, and said driving means moving said head to the track centerline position by an amount corresponding to the absolute value of said count and in a direction in accordance with the sign of said count.

3. A servo control apparatus according to claim 1, wherein said adjusting means includes a first AND gate receiving said pulse signal as one input, a first OR gate receiving said pulse signal as one input and said basic window signal from said control means for providing an OR output, a delay circuit receiving said pulse signal for providing a delayed pulse signal as an output, a flip-flop circuit receiving said delayed pulse signal from said delay circuit and said basic window signal from said control means for providing an output of said basic window signal using said delayed pulse signal as a clock signal, a second AND gate receiving said OR output of said first OR gate and the output of said flip-flop circuit for providing a real window signal, and said first AND gate receiving said real window signal of said second AND gate for providing said adjusted output signal of only the deviation-indicating pulses of said pulse signal occurring within said predetermined time period.

* * * * *